US011115425B2

(12) United States Patent
Ando et al.

(10) Patent No.: US 11,115,425 B2
(45) Date of Patent: Sep. 7, 2021

(54) IN-VEHICLE APPARATUS AND LOG COLLECTION SYSTEM

(71) Applicant: CLARION CO., LTD., Saitama (JP)

(72) Inventors: Eriko Ando, Tokyo (JP); Yasushi Nagai, Saitama (JP); Nobuyoshi Morita, Tokyo (JP)

(73) Assignee: CLARION CO., LTD., Saitama (JP)

( * ) Notice: Subject to any disclaimer, the term of this patent is extended or adjusted under 35 U.S.C. 154(b) by 332 days.

(21) Appl. No.: 16/326,938

(22) PCT Filed: Jun. 27, 2017

(86) PCT No.: PCT/JP2017/023616
§ 371 (c)(1),
(2) Date: Feb. 21, 2019

(87) PCT Pub. No.: WO2018/037708
PCT Pub. Date: Mar. 1, 2018

(65) Prior Publication Data
US 2019/0182275 A1    Jun. 13, 2019

(30) Foreign Application Priority Data
Aug. 25, 2016 (JP) ............................. JP2016-164804

(51) Int. Cl.
*H04L 29/06* (2006.01)
*G06F 21/55* (2013.01)
(Continued)

(52) U.S. Cl.
CPC .......... *H04L 63/1416* (2013.01); *G06F 11/07* (2013.01); *G06F 11/30* (2013.01);
(Continued)

(58) Field of Classification Search
CPC ............... H04L 63/1416; H04L 63/107; H04L 63/1425; G06F 21/55; G06F 11/07;
(Continued)

(56) References Cited

U.S. PATENT DOCUMENTS 9,428,195 B1 * 8/2016 Surpi ..................... G06F 16/955
9,754,325 B1 * 9/2017 Konrardy ................ H04L 67/12
(Continued)

FOREIGN PATENT DOCUMENTS

EP         1981002 A2 * 10/2008 ............. G07C 5/008
JP     2005-012441 A      1/2005
(Continued)

OTHER PUBLICATIONS

Extended European Search Report received in corresponding European Application No. 17843196.1 dated Mar. 23, 2020.
(Continued)

*Primary Examiner* — Taghi T Arani
*Assistant Examiner* — Badri Narayanan Champakesan
(74) *Attorney, Agent, or Firm* — Mattingly & Malur, PC

(57) ABSTRACT

An in-vehicle apparatus is an in-vehicle apparatus connected to a server via a network and mounted on a vehicle. The in-vehicle apparatus includes: a log collection unit configured to collect a log; a log storage unit for accumulation of at least a part of the log; a log priority information storage unit storing log priority information indicating a priority of a log to be accumulated in the log storage unit; an accumulation log determination unit configured to determine a log to be accumulated in the log storage unit based on the log priority information; a communication unit configured to transmit the log accumulated in the log storage unit to the server; and a log priority table management unit configured
(Continued)

to update the log priority information stored in the log priority information storage unit based on an update command from the server.

9 Claims, 8 Drawing Sheets

(51) Int. Cl.
*G06F 11/07* (2006.01)
*G06F 11/34* (2006.01)
*G06F 11/30* (2006.01)
*G07C 5/00* (2006.01)

(52) U.S. Cl.
CPC .............. *G06F 11/34* (2013.01); *G06F 21/55* (2013.01); *G07C 5/008* (2013.01); *H04L 63/107* (2013.01); *H04L 63/1425* (2013.01)

(58) Field of Classification Search
CPC ...... G06F 11/34; G06F 11/30; G06F 11/3476; G07C 5/008
USPC .......................................................... 726/22
See application file for complete search history.

(56) References Cited

U.S. PATENT DOCUMENTS

| | | | |
|---|---|---|---|
| 2001/0020893 A1* | 9/2001 | Kawai | G07C 5/008 340/425.5 |
| 2005/0010929 A1* | 1/2005 | Wang | H04L 63/1425 719/318 |
| 2005/0251579 A1* | 11/2005 | Ngo | G07C 5/085 709/234 |
| 2007/0143851 A1* | 6/2007 | Nicodemus | G06F 21/577 726/25 |
| 2007/0147262 A1* | 6/2007 | Aaron | H04L 63/30 370/250 |
| 2009/0018780 A1* | 1/2009 | Sookhu | G06Q 10/00 702/24 |
| 2010/0332072 A1* | 12/2010 | Ishiko | G07C 5/085 701/29.5 |
| 2011/0163877 A1* | 7/2011 | Nebot | G08G 1/207 340/540 |
| 2012/0224057 A1* | 9/2012 | Gill | H04L 63/102 348/143 |
| 2013/0204493 A1* | 8/2013 | Ricci | G06F 11/2038 701/41 |
| 2013/0317692 A1* | 11/2013 | Iga | G07C 5/008 701/31.4 |
| 2014/0325010 A1* | 10/2014 | Fujii | G06F 3/1273 709/207 |
| 2015/0039174 A1* | 2/2015 | Takahashi | G08G 1/205 701/29.1 |
| 2015/0112730 A1* | 4/2015 | Binion | G06Q 40/08 705/4 |
| 2015/0307108 A1* | 10/2015 | Chollet | G08G 1/123 348/149 |
| 2015/0343967 A1* | 12/2015 | Jeon | H04L 63/1491 713/184 |
| 2016/0021127 A1* | 1/2016 | Yan | H04L 63/1416 726/23 |
| 2016/0171801 A1* | 6/2016 | Kim | G06F 11/302 701/1 |
| 2017/0278323 A1* | 9/2017 | Gupta | H04L 63/1408 |

FOREIGN PATENT DOCUMENTS

| | | | |
|---|---|---|---|
| JP | 2012-221031 A | 11/2012 | |
| JP | 2012-252606 A | 12/2012 | |
| JP | 2016-099925 A | 5/2016 | |
| JP | 2016-126645 A | 7/2016 | |
| JP | 2016-224480 A | 12/2016 | |
| WO | WO-2016125111 A1 * | 8/2016 | ............. G07C 5/008 |

OTHER PUBLICATIONS

International Search Report of PCT/JP2017/023616 dated Aug. 29, 2017.

* cited by examiner

FIG. 3

| LOG TYPE | LOG CONTENT |
|---|---|
| RECEIVED PACKET AMOUNT | DATE AND TIME (PERIOD), LOCATION INFORMATION, RECEIVED PACKET AMOUNT PER UNIT TIME |
| NUMBER OF AUTHENTICATION FAILURES | DATE AND TIME (PERIOD), LOCATION INFORMATION, ACCESS IF, ACCESS SOURCE ID, NUMBER OF AUTHENTICATION FAILURES |
| NUMBER OF MESSAGE ERRORS | DATE AND TIME (PERIOD), LOCATION INFORMATION, TRANSMISSION SOURCE ID, MESSAGE TYPE, NUMBER OF ERRORS |
| ACCESS TO FILE A | DATE AND TIME, PROGRAM THAT HAS ACCESSED, ACCESS TIME |
| CPU UTILIZATION | DATE AND TIME (PERIOD), LOCATION INFORMATION, CPU UTILIZATION |
| ... | ... |

301 — LOG TYPE column; 302 — LOG CONTENT column

FIG. 4

| | 401 | 402 | 403 | 404 | 405 | 406 | 407 |
|---|---|---|---|---|---|---|---|
| | ATTACK TYPE | IN-VEHICLE APPARATUS OF TEMPORARY LOG COLLECTION TARGET | LOG TYPE | CONDITION TYPE | AREA | SERVICE | VALID PERIOD |
| | DoS ATTACK | IN-VEHICLE APPARATUS LOCATED AROUND POINT WHERE LOG WITH POSSIBILITY OF DoS ATTACK IS COLLECTED | RECEIVED PACKET AMOUNT | AREA | WITHIN RADIUS OF 1 km | NOT SPECIFIED | 30 MINUTES |
| | | | CPU UTILIZATION | AREA | WITHIN RADIUS OF 1 km | NOT SPECIFIED | 30 MINUTES |
| | UNAUTHORIZED ACCESS | IN-VEHICLE APPARATUS OF SAME MODEL AS AND TWO SIMILAR MODELS TO IN-VEHICLE APPARATUS WITH POSSIBILITY OF UNAUTHORIZED ACCESS | ACCESS TO FILE A | SERVICE | NOT SPECIFIED | NAVIGATION | 2 HOURS |
| | ... | ... | ... | | | | |

IN-VEHICLE APPARATUS AND LOG COLLECTION SYSTEM

TECHNICAL FIELD

The present invention relates to an in-vehicle apparatus and a log collection system.

BACKGROUND ART

In recent years, along with in-vehicle apparatuses being networked and the like, the necessity of adequate security is increasing also in the field of in-vehicle apparatus systems. Regarding such a security technology of in-vehicle apparatuses, there is widely known a configuration in which a server on a network grasps a situation of an in-vehicle apparatus, and the server detects an abnormality of the in-vehicle apparatus. PTL 1 discloses an apparatus that is capable of transmitting mobile information such as location information from a moving object such as a vehicle by a proper method according to circumstances.

CITATION LIST

Patent Literature

PTL 1: JP 2005-12441 A

SUMMARY OF INVENTION

Technical Problem

In abnormality detection of an in-vehicle apparatus with use of a server as described above, by collecting a lot of detailed information as a log in the in-vehicle apparatus and transmitting to the server, the server can detect various abnormalities caused in the in-vehicle apparatus. However, in general, the in-vehicle apparatus has poor resources due to installation space restriction and the like, and an amount of information that can be collected is limited. Therefore, it is necessary to collect appropriate logs in accordance with situations of the in-vehicle apparatuses, but this cannot be done in the invention described in PTL 1.

Solution to Problem

An in-vehicle apparatus according to a first aspect of the present invention is an in-vehicle apparatus connected to a server via a network and mounted on a vehicle. The in-vehicle apparatus includes: a log collection unit configured to collect a log; a log storage unit for accumulation of at least a part of the log; a log priority information storage unit storing log priority information indicating a priority of a log to be accumulated in the log storage unit; an accumulation log determination unit (S606) configured to determine a log to be accumulated in the log storage unit based on the log priority information; a communication unit configured to transmit the log accumulated in the log storage unit to the server; and a log priority table management unit configured to update the log priority information stored in the log priority information storage unit based on an update command from the server.

A log collection system according to a second aspect of the present invention is a log collection system including the information processing apparatus according to the first aspect and the server connected to the in-vehicle apparatus by the network. In the log collection system, the server includes a log analysis unit configured to analyze a log received from the in-vehicle apparatus and detect a possibility of attack; a log priority change instruction unit configured to transmit the update command to the in-vehicle apparatus to update the log priority information stored in the log priority information storage unit, when the log analysis unit detects a possibility of attack.

Advantageous Effects of Invention

According to the present invention, it is possible to collect appropriate logs in accordance with a situation of an in-vehicle apparatus.

BRIEF DESCRIPTION OF DRAWINGS

FIG. 3 is a view illustrating a configuration of a log table.

FIG. 4 is a view illustrating a configuration of a temporary log table.

DESCRIPTION OF EMBODIMENTS

Hereinafter, an embodiment of a log collection system will be described with reference to FIGS. 1 to 8.

Figure 1:
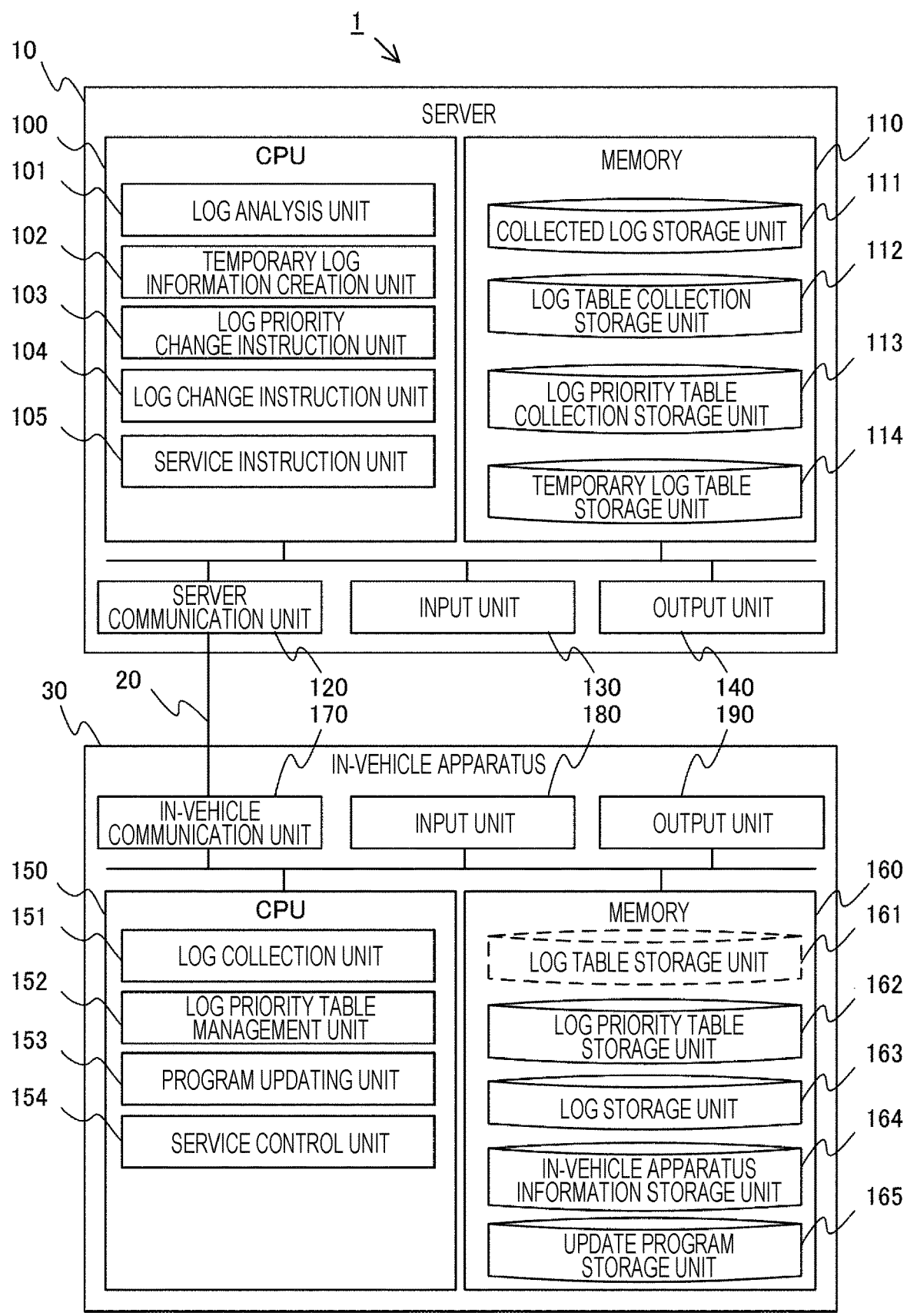
FIG. 1 is a configuration diagram of a log collection system.

FIG. 1 is a configuration diagram of the log collection system. A log collection system 1 includes a server 10 and an in-vehicle apparatus 30. The server 10 and the in-vehicle apparatus 30 are connected via a network 20. FIG. 1 describes only one in-vehicle apparatus 30, but the server 10 is connected to a plurality of in-vehicle apparatuses 30. The plurality of in-vehicle apparatuses 30 connected to the server 10 are individually mounted on different vehicles. By executing one or a plurality of programs, the in-vehicle apparatus 30 can provide various services to a passenger of the vehicle. The program executed in the in-vehicle apparatus 30 is incorporated at a time of shipment of the in-vehicle apparatus 30.

(Configuration of Server)

The server 10 includes a CPU 100, a memory 110, a server communication unit 120, an input unit 130, and an output unit 140. Hereinafter, a person who operates the input unit 130 of the server 10 is referred to as "operator".

The CPU 100 executes a program stored in a ROM (not shown) and executes various kinds of arithmetic processing for operating the server 10. This program uses data stored in the memory 110. The CPU 100 functionally includes a log analysis unit 101, a temporary log information creation unit 102, a log priority change instruction unit 103, a log change instruction unit 104, and a service instruction unit 105.

The log analysis unit 101 analyzes a log collected from the in-vehicle apparatus 30, detects a possibility of attack on the in-vehicle apparatus 30, and detects attack on the in-vehicle apparatus 30. When the log analysis unit 101 detects a possibility of attack on the in-vehicle apparatus 30, the temporary log information creation unit 102 rewrites a log table described later and a log priority table described later. The log priority change instruction unit 103 creates a log priority table change request message for notifying the in-vehicle apparatus 30 of information on the log priority table rewritten by the temporary log information creation unit 102, and transmits the log priority table change request message to the in-vehicle apparatus 30. Meanwhile, the log priority table change request message includes the entire contents of the rewritten log priority table. The log change instruction unit 104 notifies the in-vehicle apparatus 30 of information on the log table rewritten by the temporary log information creation unit 102. However, as will be described later, since the information on the log table is included in the program in this embodiment, the log change instruction unit 104 notifies the in-vehicle apparatus 30 of the change of the log table by transmitting the program to the in-vehicle apparatus 30. When the log analysis unit 101 determines that it is necessary to stop the service immediately, the service instruction unit 105 outputs an instruction to stop the service to the in-vehicle apparatus 30.

The memory 110 stores data. The memory 110 functionally includes a collected log storage unit 111, a log table collection storage unit 112, a log priority table collection storage unit 113, and a temporary log table storage unit 114.

The collected log storage unit 111 stores logs collected from the individual in-vehicle apparatuses 30.

The log table collection storage unit 112 stores a log table that specifies information to be collected as a log by each in-vehicle apparatuses 30. Since the log table differs for each in-vehicle apparatus 30, the log table collection storage unit 112 stores log tables of the same number as that of the in-vehicle apparatuses 30 connected to the server 10. However, some in-vehicle apparatuses 30 may share a log table, and the number of log tables stored in the log table collection storage unit 112 may be smaller than the number of in-vehicle apparatuses 30 connected to the server 10.

The log priority table collection storage unit 113 stores a log priority table indicating priorities of logs to be accumulated by individual in-vehicle apparatuses 30. Since the log priority table differs for each in-vehicle apparatus 30, the log priority table collection storage unit 113 stores log priority tables of the same number as that of the in-vehicle apparatuses 30 connected to the server 10. However, some in-vehicle apparatuses 30 may share a log priority table, and the number of log priority tables stored in the log priority table collection storage unit 113 may be smaller than the number of in-vehicle apparatuses 30 connected to the server 10.

The temporary log table storage unit 114 stores a temporary log table defining a log to be temporarily collected when the log analysis unit 101 detects a risk of attack occurrence. In the present embodiment, there is one temporary log table, which is commonly used for all in-vehicle apparatuses 30.

The server communication unit 120 communicates with the in-vehicle apparatus 30 via the network 20.

The input unit 130 detects an operation input from the operator and outputs to the CPU 100. The input unit 130 is configured by, for example, a mouse, a keyboard, or the like.

The output unit 140 performs screen display and audio output in accordance with an instruction from the CPU 100. The output unit 140 is configured by, for example, a display, a speaker, or the like.

(Configuration of In-Vehicle Apparatus)

The in-vehicle apparatus 30 includes a CPU 150, a memory 160, an in-vehicle communication unit 170, an input unit 180, and an output unit 190. Hereinafter, a person who operates the input unit 180 of the in-vehicle apparatus 30 and a passenger of a vehicle mounted with the in-vehicle apparatus 30 is referred to as "user".

The CPU 150 executes a program (not shown) stored in the memory 160 and executes various kinds of arithmetic processing for operating the in-vehicle apparatus 30. This arithmetic processing also includes execution of a program for providing a service to the user. The CPU 150 functionally includes a log collection unit 151, a log priority table management unit 152, a program updating unit 153, and a service control unit 154.

The log collection unit 151 acquires a log to be transmitted to the server 10, and accumulates the log into a log storage unit 163. What kind of information the log collection unit 151 collects as a log is hard-coded in the program. The log priority table management unit 152 updates the log priority table stored in a log priority table storage unit 162 based on the instruction of the server 10. The program updating unit 153 updates the program executed by the CPU 150 into a program stored in an update program storage unit 165. This update of the program changes information to be collected as a log by the log collection unit 151. The service control unit 154 controls provision of a service based on a service start/stop instruction with use of the input unit 180 by the user, and a service stop instruction from the server 10.

The memory 160 functionally includes a log table storage unit 161, the log priority table storage unit 162, the log storage unit 163, an in-vehicle apparatus information storage unit 164, and the update program storage unit 165. However, the log table is included in the above-mentioned program stored in the memory 160. That is, since the log table is stored in the memory 160 in a different form, the log table storage unit 161 is indicated by a broken line in FIG. 1.

The log table storage unit 161 stores a log table, which is information indicating specific contents of information to be collected as a log. In other words, the information stored in the log table is information indicating information to be collected as a log. The log priority table storage unit 162 stores a log priority table, which is information for managing priority of a log to be accumulated. The log storage unit 163 accumulates and stores the log acquired by the log collection unit 151. The in-vehicle apparatus information storage unit 164 stores a device ID for identifying the in-vehicle apparatus. The update program storage unit 165 temporarily stores a program received from the server.

The in-vehicle communication unit 170 communicates with the server 10 via the network 20. When transmitting the log collected by the log collection unit 151 to the server 10, the in-vehicle communication unit 170 transmits the device ID stored in the in-vehicle apparatus information storage unit 164 together with a time and location information of the in-vehicle apparatus 30, that is, latitude and longitude, when the log has been collected. The location information may be inputted from another device of the vehicle mounted with the in-vehicle apparatus 30, or the in-vehicle apparatus 30 may include a configuration to acquire location information, for example, a GPS receiver.

The input unit 180 detects an operation input from the user and outputs to the CPU 100. The input unit 180 is, for example, a keyboard input, a touch panel input, or the like. The output unit 190 performs screen display and audio output in accordance with an instruction from the CPU 150. The output unit 190 is configured by, for example, a display, a speaker, or the like.

(Service)

The in-vehicle apparatus 30 can provide various services to the user. The service provided by the in-vehicle apparatus 30 can be optionally started and stopped in accordance with an instruction of the user. However, as will be described later, the service that has received the stop command from the server 10 is stopped regardless of the operation command of the user.

The service includes, for example, a navigation service for guiding a route to a destination selected by the user, a facility introduction service for introducing recommended spots around a current location or a destination inputted by the user, a maintenance service for informing a timing of parts replacement of the vehicle, a traffic jam information service for informing traffic congestion information on surrounding roads, and the like. Individual programs that execute these services store an input history of the user in an individually independent files, for improvement of convenience. It is assumed that these files are accessed only from programs that execute the individual services.

(Log Priority Table)

Figure 2:
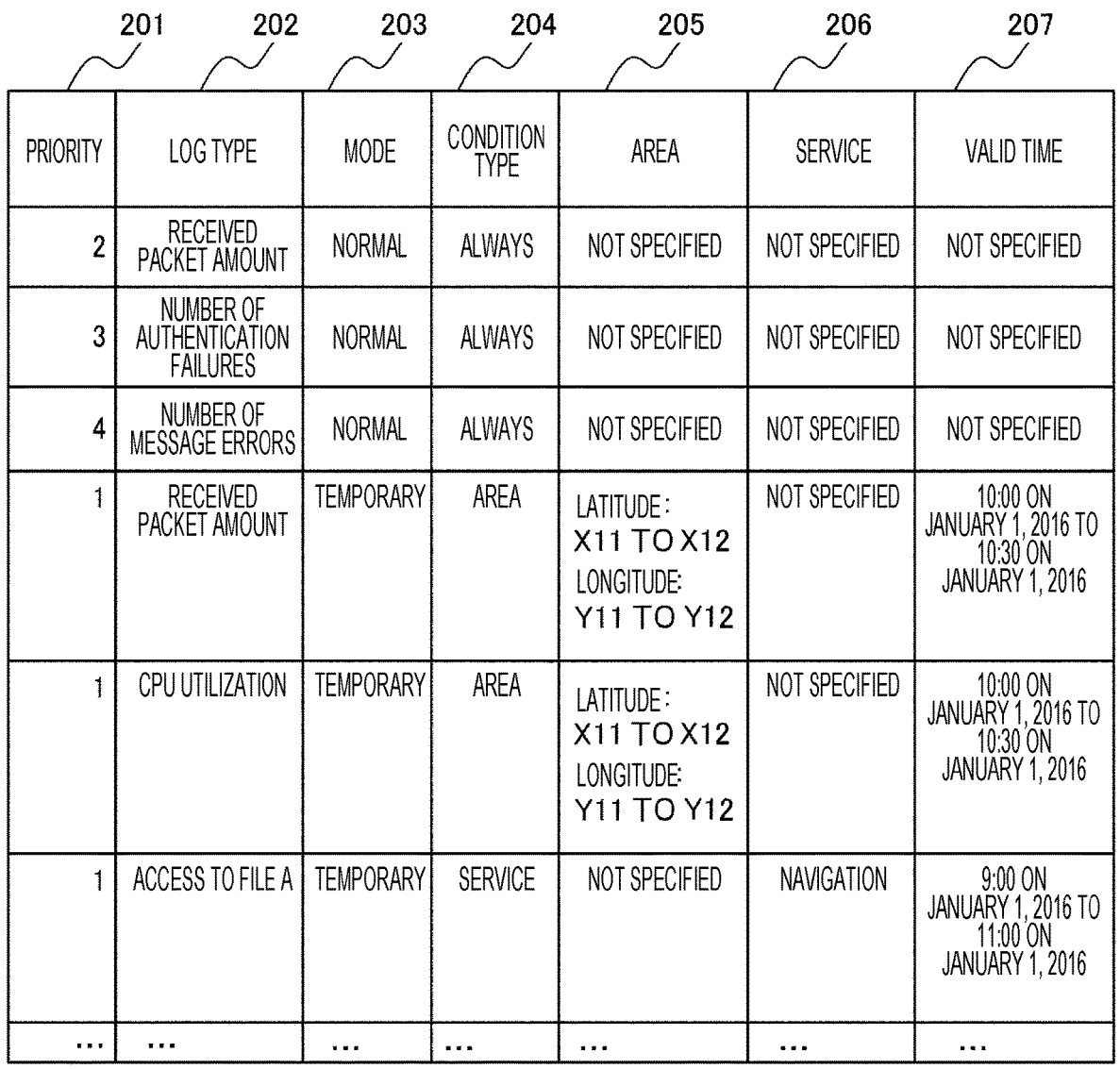
FIG. 2 is a view illustrating a configuration of a log priority table.

FIG. 2 is a view illustrating a configuration of a log priority table stored in the log priority table collection storage unit 113 of the server 10 and in the log priority table storage unit 162 of the in-vehicle apparatus 30. As will be described in detail later, whether or not to accumulate a collected log is determined with a priority described in the log priority table. A log that is not listed in the log priority table is treated as having a lowest priority. Note that FIG. 2 shows an example of the log priority table stored in the log priority table storage unit 162 of the in-vehicle apparatus 30 for one in-vehicle apparatus 30. Therefore, a plurality of types of log priority tables as shown in FIG. 2 are stored in the log priority table collection storage unit 113 of the server 10 in accordance with the number of the in-vehicle apparatuses 30 included in the log collection system 1.

The log priority table is formed by seven fields of a priority 201, a log type 202, a mode 203, a condition type 204, an area 205, a service 206, and a valid time 207. The log priority table is formed by one or more records.

The field of the priority 201 stores information indicating a priority for accumulating logs as a numerical value, and a smaller numerical value indicates a higher priority. There may be a plurality of records having a same priority. The field of the log type 202 stores an identifier indicating a type of a log. The field of the mode 203 stores information indicating whether the record is permanently valid or temporarily valid. "Normal" is stored when it is permanent while "Temporary" is stored when it is temporary. When the mode 203 is "Temporary", the valid time 207 stores a valid period of the record. In other words, a record that is permanently valid indicates that a period to be stored in the valid time 207 is "undetermined and permanent".

The field of the condition type 204 stores a condition on which the record is valid. When the record is always valid without a particular condition, "Always" is stored, whereas when the record is valid under some condition, the condition is stored. For example, when the record is valid on condition that the in-vehicle apparatus 30 is in a specific area, "Area" is stored in the condition type 204. Further, when the record is valid on condition that the in-vehicle apparatus 30 is executing a specific service, "Service" is stored in the condition type 204. The field of the area 205 stores a condition relating to an area when "Area" is stored in the condition type 204. The field of the service 206 stores a condition relating to a service when "Service" is stored in the condition type 204.

The field of the valid time 207 stores a period during which the record whose mode 203 is "temporary" is valid. For example, the fourth record in FIG. 2 shows that the in-vehicle apparatus 30 is located in a range of the latitude X11 to X12 and in a range the longitude Y11 to Y12, and is valid only for 30 minutes from 10:00 to 10:30 on Jan. 1, 2016.

Note that the information stored in the log priority table collection storage unit 113 of the server 10 and in the log priority table storage unit 162 of the in-vehicle apparatus 30 may be information in a format other than the table format as shown in FIG. 2. That is, as long as the information appropriately indicates a priority of a log to be accumulated in the log storage unit 163, information in any format may be stored in the log priority table collection storage unit 113 and the log priority table storage unit 162.

(Log Table)

FIG. 3 is a view illustrating a configuration of a log table stored in the log table collection storage unit 112 of the server 10 and in the log table storage unit 161 of the in-vehicle apparatus 30. The log table is a table for specifying information to be collected as a log by the log collection unit 151. Note that FIG. 3 shows an example of the log table stored in the log table storage unit 161 of the in-vehicle apparatus 30 for one in-vehicle apparatus 30. Therefore, a plurality of types of log tables as shown in FIG. 3 are stored in the log table collection storage unit 112 of the server 10 in accordance with the number of the in-vehicle apparatuses 30 included in the log collection system 1. The log table is formed by one or a plurality of records, and formed by two fields of a log type 301 and a log content 302. The field of the log type 301 stores an identifier indicating a type a log, that is, the same information as that of the log type 202 of the log priority table. The field of the log content 302 stores specific contents of information to be acquired as a log.

Note that the information stored in the log table collection storage unit 112 of the server 10 and in the log table storage unit 161 of the in-vehicle apparatus 30 may be information in a format other than the table format as shown in FIG. 3. That is, as long as the information appropriately indicates the contents of the log to be collected in the log collection unit 151, information in any format may be stored in the log table collection storage unit 112 and the log table storage unit 161.

(Detection of Attack)

It is assumed that the in-vehicle apparatus 30 connected to the network receives various kinds of attack from outside. Further, it is also assumed that the in-vehicle apparatus 30 receives attack that is closely related to a specific service.

For example, a denial of service (DoS) attack may be considered as attack without limiting to a specific service. The DoS attack is to waste communication resources and computation resources by sending a large amount of data, to hinder normal operation of the in-vehicle apparatus 30. This attack is detected by recording a received packet amount indicating an amount of data received by the in-vehicle apparatus 30, and a CPU utilization indicating magnitude of a processing load. Therefore, it is specified in a temporary log table described later that the received packet amount and the CPU utilization are preferentially recorded if it is determined that the DoS attack may have occurred.

As attack related to a specific service, for example, unauthorized access to a file used in a service may be considered. For example, for a specific file (hereinafter referred to as a file A) used by a certain service, the following case is assumed in which the right for reading and writing of the file A is given only to a specific program. That is, a case is assumed in which a person who wants information stored in the file A accesses the in-vehicle apparatus 30 to illegally acquire the information of the file A. This attack is detected by recording an access record to the file A, for example, a name of a program that has accessed and an access time. Therefore, it is specified in a temporary log table described later that a date and time when the access to the file A has occurred, a program that has accessed, and the like are preferentially recorded if it is determined that an unauthorized access may have occurred.

(Temporary Log Table)

FIG. 4 is a view illustrating a configuration of a temporary log table stored in the temporary log table storage unit 114 of the server 10. The temporary log table is formed by one or more records. The temporary log table is formed by fields of an attack type 401, an in-vehicle apparatus of temporary log collection target 402, a log type 403, a condition type 404, an area 405, a service 406, and a valid period 407. Hereinafter, a log collected based on this temporary log table is referred to as "temporary log".

The field of the attack type 401 stores a type of attack determined, by the log analysis unit 101 of the server 10, to have a possibility of attack occurrence.

The field of the in-vehicle apparatus of temporary log collection target 402 stores a condition for the in-vehicle apparatus 30 to be a target of temporary log collection. In other words, it is a condition for the in-vehicle apparatus 30 for which the log priority table is updated. This condition is, for example, a geographical condition and a condition relating to a configuration of the in-vehicle apparatus 30. The geographical condition is, for example, being present within a predetermined distance from a point where a log determined to have a possibility of attack has been collected. The condition relating to a configuration of the in-vehicle apparatus 30 is, for example, that a model is coincident with that of the in-vehicle apparatus 30 that has collected the log determined to have the possibility of attack.

The field of the log type 403 stores an identifier of a log to be collected temporarily. The field of a condition type 404 stores a condition for collecting a temporary log. The field of the area 405 stores a condition of an area when the condition type 404 indicates Area. The field of the service 406 stores a condition for a service being executed when the condition type 404 indicates Service. The field of the valid period 407 stores a valid period of the temporary log collection. Note that the condition type 404 is not limited to the area and the service, and other conditions may be used. In that case, a field describing a content of the condition type is newly provided in the temporary log table.

When the log analysis unit 101 determines that there is a possibility of attack occurrence on any in-vehicle apparatus 30, the temporary log information creation unit 102 of the server 10 rewrites the log priority table for a plurality of in-vehicle apparatuses 30 including such an in-vehicle apparatus, among the log priority tables stored in the log priority table collection storage unit 113, based on the temporary log table stored in the temporary log table storage unit 114. When the rewritten log priority table is transmitted from the server 10 to each in-vehicle apparatus 30, the log priority table stored in the log priority table storage unit 162 in each in-vehicle apparatus 30 is updated. As a result, the log priority table of the in-vehicle apparatus 30 is changed reflecting the temporary log table, and the log corresponding to the changed log priority table is accumulated in the in-vehicle apparatus 30. In the example of the log priority table shown in FIG. 2, three records with the field of the mode 203 "Temporary" are records that have been added based on the temporary log table. Among these records, the above two records have been added as being determined to have a possibility of "DoS attack" at 10:00 on Jan. 1, 2016, the one below is a record that has been added as being determined to have a possibility of "Unauthorized access" at 9:00 on Jan. 1, 2016.

(Log Collection)

The log collection unit 151 of the in-vehicle apparatus 30 collects a log at predetermined time intervals, for example, every one minute. Information collected by the log collection unit 151 is described in a log table included in the program.

The logs collected by the log collection unit 151 are merged as much as possible and stored in the log storage unit 163. Merging logs is to also save new logs together without increasing an amount of data, by rewriting the saved logs. Information to be rewritten at the time of merging is mainly information related to time. For example, in a case where an average of a received packet amount in 5 minutes from 10:00 is 80 packets/minute, the log has been recorded as "10:00 to 10:05, 80 P/min". In a case where an average value of a received packet amount for 5 minutes from 10:05 is also 80 packets/minute, the log can be recorded as "10:00 to 10:10, 80 P/min" by merging with the log above. Meanwhile, when the average value of the received packet amount for 5 minutes from 10:05 is 100 packets/minute, the log may also be recorded as "10:00 to 10:10, 90 P/min" by merging with the log above.

(Flowchart of Log Collection)

Figure 5:
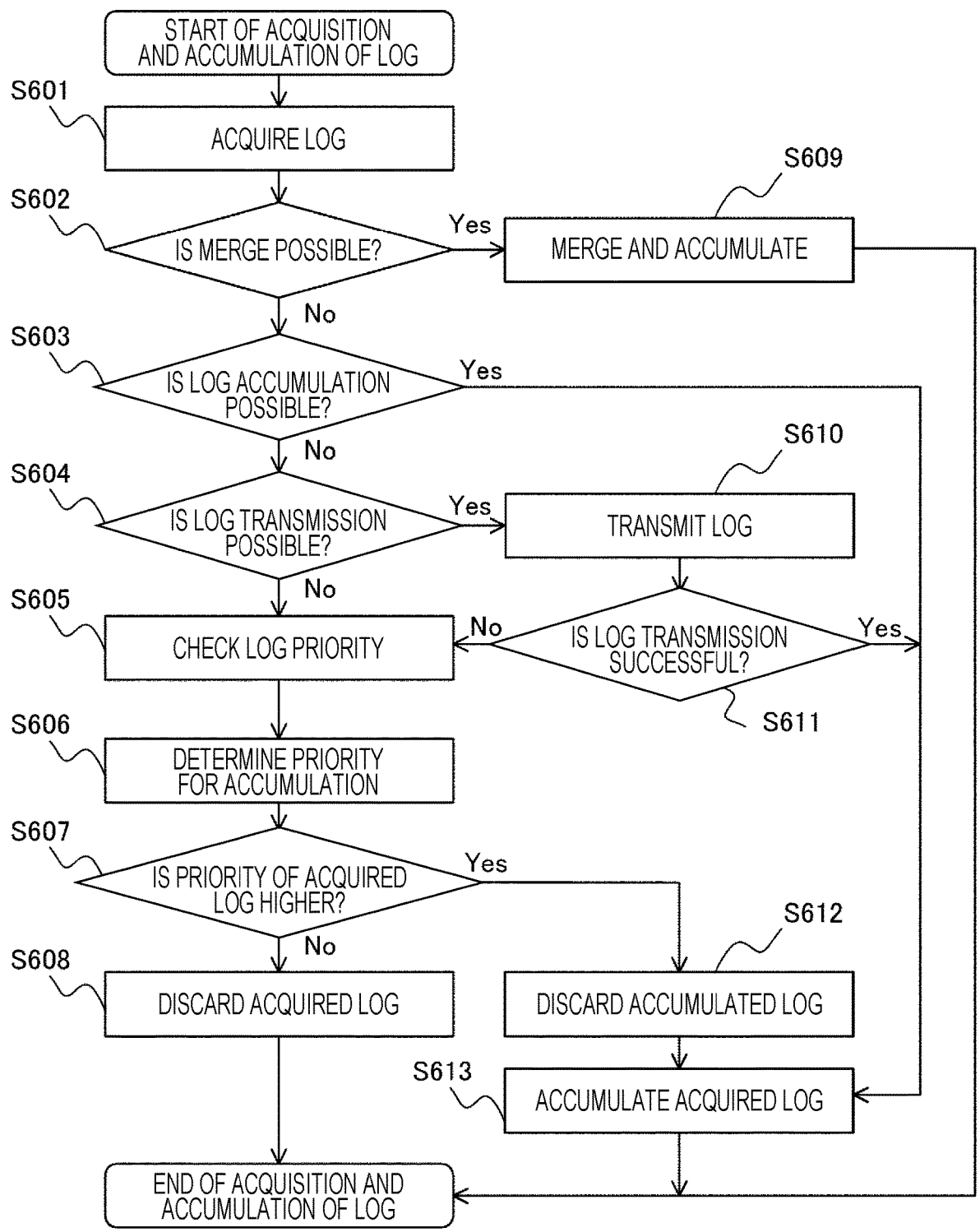
FIG. 5 is a flowchart showing a process of acquiring and accumulating a log by an in-vehicle apparatus.

FIG. 5 is a flowchart showing a process of acquiring and accumulating a log by the in-vehicle apparatus 30. An execution subject of each step described below is the CPU 150 of the in-vehicle apparatus 30.

In step S601, a log is collected with use of the log collection unit 151. As described above, the log information to be collected by the log collection unit 151 is hard-coded in the program. The log collected in this step is placed in a temporary storage area, and is not stored in the log storage unit 163 yet. In the following step S602, it is determined whether or not the acquired log can be merged with the log stored in the log storage unit 163. When it is determined that the merging is possible, the process proceeds to step S609, whereas when it is determined that the merging is impossible, the process proceeds to step S603. Meanwhile, when multiple logs are acquired and it is determined that only a part of the logs can be merged, only a log that cannot be merged is subjected to processing in step S603 and the subsequent steps.

In step S603, a free capacity of the log storage unit 163 is compared with a capacity of the acquired log, and it is determined whether or not the log can be accumulated in the log storage unit 163. When it is determined that the accumulation is possible, the process proceeds to step S613, whereas when it is determined that the accumulation is impossible, the process proceeds to step S604. The determination in this step may be made by simply comparing the free capacity of the log storage unit 163 with the capacity of the acquired log, or by comparing the free capacity of the log storage unit 163 excluding a predetermined reserved capacity, with the capacity of the acquired log.

In step S604, it is determined whether or not transmission of the acquired log to the server 10 is possible, that is, whether or not communication is possible between the in-vehicle apparatus 30 and the server 10. When it is determined that the log transmission is possible, the process proceeds to step S610, whereas when it is determined that the log transmission is impossible, the process proceeds to step S605.

In step S605, with reference to the log priority table stored in the log priority table storage unit 162, a priority of the log determined to be impossible for transmission is determined. At this time, for a record with the field of the condition type 204 in the log priority table is other than "Always", the record is treated as valid only when the described condition is satisfied, and the record is treated as invalid when the condition is not satisfied. If the record is treated as invalid, the record is considered to have a lowest priority similarly to a case of not being described in the log priority table.

In the following step S606, a priority of the log to be accumulated is determined based on the free capacity of the log storage unit 163. As the free capacity is larger, logs having a lower priority are to be accumulated, while as the free capacity is smaller, only logs having a higher priority are to be accumulated. In the following step S607, the priority determined in step S606 is compared with the priority of the acquired log specified in step S605. When it is determined that the priority of the acquired log is higher, the process proceeds to step S612. When it is determined that the priority of the acquired log is equal to or lower than the priority determined in step S606, the process proceeds to step S608.

In step S608, the acquired log is discarded and the flowchart of FIG. 5 is ended.

In step S609, the acquired log is merged with the log stored in the log storage unit 163, and the flowchart of FIG. 5 is ended.

In step S610 executed when affirmative determination is made in step S604, the log stored in the log storage unit 163 is transmitted to the server 10. In the following step S611, it is determined whether or not the log transmission has been successful. When it is determined that the log transmission has been successful, the process proceeds to step S613, whereas when it is determined that the log transmission has failed, the process proceeds to step S605.

In step S612 executed when affirmative determination is made in step S607, the log having the lowest priority among the logs accumulated in the log storage unit 163 is discarded. In step S613, the acquired log is accumulated in the log storage unit 163 of the memory 160, and the flowchart of FIG. 5 is ended.

(Operation of Log Analysis Unit)

The log analysis unit 101 of the server 10 analyzes a log acquired from the in-vehicle apparatus 30, thereby detecting a possibility of attack on the in-vehicle apparatus 30 or detecting attack on the in-vehicle apparatus 30. There are various kinds of attack on the in-vehicle apparatus 30, and new techniques are devised every day. A detection method described here is an example, and when a new attack technique is found, an analysis method for detecting the attack is implemented in the log analysis unit 101. As an example of an operation of the log analysis unit 101, detection of a DoS attack will be described.

The log analysis unit 101 detects a possibility that the DoS attack is occurring, by using a log of a certain in-vehicle apparatus 30. Upon detecting the possibility that the DoS attack is occurring, the log analysis unit 101 determines whether or not the DoS attack is actually occurring by using detailed logs of a plurality of in-vehicle apparatuses 30. In other words, the log analysis unit 101 detects the possibility of attack by using a small number of logs, and confirms the attack occurrence by using many detailed logs.

The log analysis unit 101 determines the possibility of the DoS attack by comparing a received packet amount per unit time of the in-vehicle apparatus 30 in a certain area with a received packet amount in another area. When a difference in the received packet amount is equal to or less than a certain threshold value, the log analysis unit 101 determines that there is no possibility of attack occurrence. When the difference in the received packet amount exceeds a certain threshold value, the log analysis unit 101 determines that there is a possibility of occurrence of the DoS attack.

The log analysis unit 101 determines that the DoS attack is actually occurring, by also using a CPU utilization in addition to the received packet amount. It is determined that the DoS attack is occurring when a difference between the received packet amount per unit time of the in-vehicle apparatus 30 in a certain area and the received packet amount in another area exceeds a threshold value, and the CPU utilization exceeds a predetermined threshold value. Meanwhile, the comparison of the received packet amount may be performed with, as a target, an average received packet amount at a same time in the past in a same area.

(Processing after Log Reception)

Figure 6:
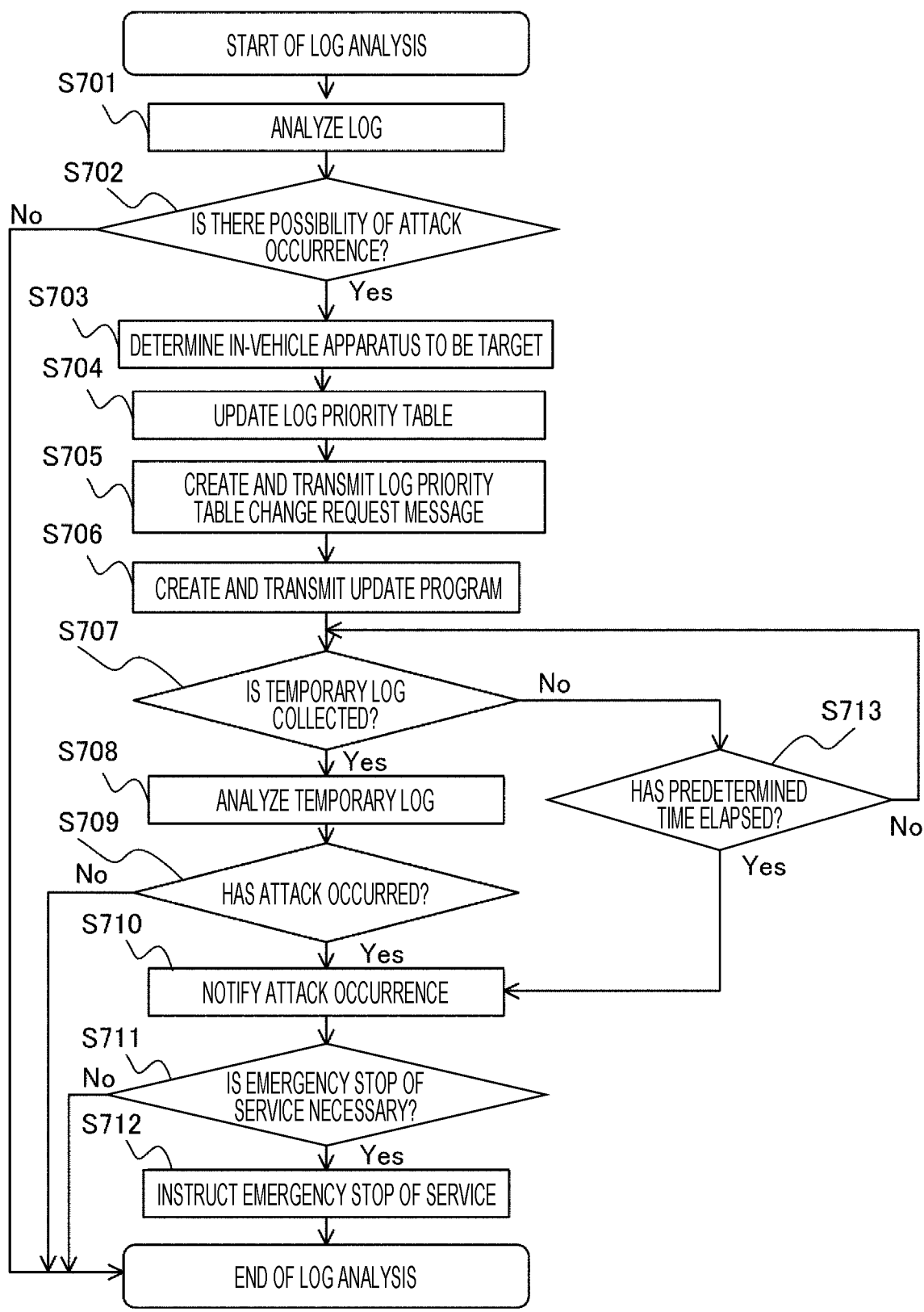
FIG. 6 is a flowchart showing a series of processes after a server collects a log.

With reference to FIG. 6, a series of processes after the server 10 collects a log from the in-vehicle apparatus 30 will be described. An execution subject of each step described below is the CPU 100 of the server 10.

In step S701, the received log is analyzed with use of the log analysis unit 101. The log analysis unit 101 determines a possibility of attack occurrence and determines a type of attack that may be occurring. In the following step S702, with reference to the analysis result in step S701, when it is determined that there is a possibility of occurrence of attack, the process proceeds to step S703, whereas when it is determined that there is no possibility of occurrence of attack, the flowchart of FIG. 6 is ended.

In step S703, the temporary log information creation unit 102 determines the in-vehicle apparatus 30 to be a temporary log collection target. First, the CPU 100 searches the temporary log table for a record that matches an attack type identified from the log analysis result in step S701. Next, the CPU 100 refers to the field of the temporary log collection target 402 in the corresponding record, to determine the temporary log collection target. For example, as shown in FIG. 4, the in-vehicle apparatus 30 being present within a radius of 1 km from a point where the log determined to have a possibility of attack has been collected, or the in-vehicle apparatuses 30 of a same model as or two similar models to the in-vehicle apparatus 30 that has collected the log determined to have the possibility of attack, is determined as a collection target. Next, the process proceeds to step S704. Steps S704 to S706 described below are individually executed for each in-vehicle apparatus 30 determined in this step.

In step S704, the temporary log information creation unit 102 updates the log priority table stored in the log priority table collection storage unit 113. The log priority table to be updated in this step is a log priority table corresponding to the in-vehicle apparatus 30 to be the temporary log collection target determined in step S703. The update of the log priority table is to add, to a new record in the log priority table, the log type 403, the condition type 404, the area 405, the service 406, and the valid period 407 that are described in the record specified in the step S703 in the temporary log table. However, the area 405 is rewritten on the basis of a position of the in-vehicle apparatus 30 at a time of collecting the log in which the possibility of attack has been detected. Further, the valid period 407 is rewritten on the basis of a time of acquiring the log in which the possibility of attack has been detected. At this time, the priority of the record to be added is set to "1" indicating the highest priority. Next, the process proceeds to step S705.

In step S705, the log priority change instruction unit 103 creates a log priority table change request message based on the log priority table updated in step S704. Then, the log priority change instruction unit 103 transmits the created log priority table change request message. Next, the process proceeds to step S706.

In step S706, the log change instruction unit 104 creates an update program for changing an operation of the log collection unit 151 of the in-vehicle apparatus 30 based on the log priority table updated in step S704. This update program is to cause the log collection unit 151 to collect all the log types described in the updated log priority table. Then, the log change instruction unit 104 transmits the created update program. Next, the process proceeds to step S707.

In step S707, it is determined whether or not a temporary log has been received from the in-vehicle apparatus 30. When it is determined that the temporary log has been received, the process proceeds to step S708. When it is determined that the temporary log has not been received, the process proceeds to step S713. In step S713, it is determined whether or not a predetermined time, for example, 30 minutes has elapsed since the execution of step S706. When it is determined that the predetermined time has not elapsed, the process returns to step S707. When it is determined that the predetermined time has elapsed, the process proceeds to step S710. This is because, in a case where the temporary log is not transmitted from any in-vehicle apparatus for a certain period of time, it is a situation where logs cannot be collected or a situation where log transmission cannot be performed, and occurrence of some attack can be presumed.

In step S708, the received temporary log is analyzed with use of the log analysis unit 101. In the following step S709, when it is determined from the analysis result of step S708 that attack has occurred, the process proceeds to step S710, whereas when it is determined that no attack has occurred, the flowchart of FIG. 6 is ended.

In step S710, the occurrence of attack is notified to the operator of the server 10 with use of the output unit 140. In the following step S711, it is determined whether or not emergency stop of the service is necessary. When it is determined that the emergency stop of the service is necessary, the process proceeds to step S712, whereas when it is determined to be unnecessary, the flowchart of FIG. 6 is ended. In step S712, the emergency stop of the service is instructed to the in-vehicle apparatus 30 with use of the service instruction unit 105, and the flowchart of FIG. 6 is ended.

(Updating Process of Log Priority Table)

Figure 7:
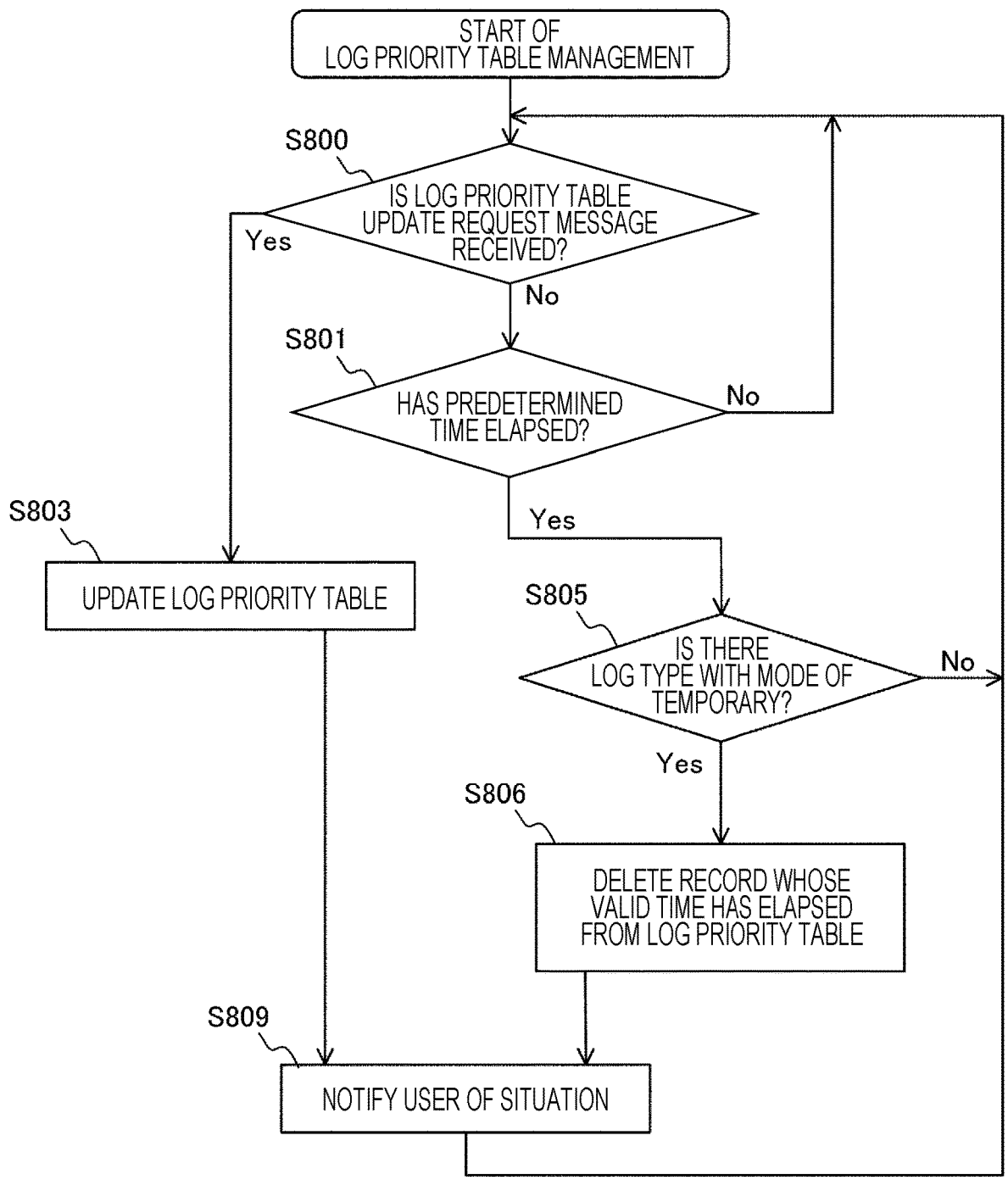
FIG. 7 is a flowchart showing an updating process of a log priority table by the in-vehicle apparatus.

FIG. 7 is a flowchart showing an updating process of the log priority table by the in-vehicle apparatus 30. An execution subject of each step described below is the log priority table management unit 152.

In step S800, it is determined whether or not a log priority table update request message has been received from the server 10. When it is determined that the log priority table update request message has been received, the process proceeds to step S803, whereas when it is determined that the log priority table update request message has not been received, the process proceeds to step S801.

In step S803, in accordance with the received log priority table update request message, the log priority table stored in the log priority table storage unit 162 is updated. As described above, since the entire contents of the rewritten log priority table are included in the log priority table update request message, update in this step means replacement of the log priority table. Next, the process proceeds to step S809.

In step S801 executed when it is determined in step S800 that the message has not been received, it is determined whether or not a certain period of time, for example, five minutes has elapsed since the previous execution of step S805. When it is determined that the time has elapsed, the process proceeds to step S805, whereas when it is determined that the time has not elapsed, the process returns to step S800.

In step S805, it is determined whether or not there is a record whose field of the mode 203 is "Temporary" in the log priority table stored in the log priority table storage unit 162. When it is determined that there is a relevant record, the process proceeds to step S806, whereas when it is determined that there is no relevant record, the process returns to step S800.

In step S806, for records whose field of the mode 203 of the log priority table is "Temporary", a record whose valid time has elapsed is deleted. For example, when the current time is 10:45 on Jan. 1, 2016 and the log priority table is the one shown in FIG. 2, among the three records whose field of the mode 203 is "Temporary", the above two records are deleted. This is because the valid time of these records has elapsed, and the valid time of the remaining one has not elapsed. Next, the process proceeds to step S809.

In step S809, by using the output unit 190, the CPU 150 notifies the user of a situation, that is, notifies the fact that the log priority table has been rewritten, and the process returns to step S800.

(Updating Process of Program for Collecting Log)

Figure 8:
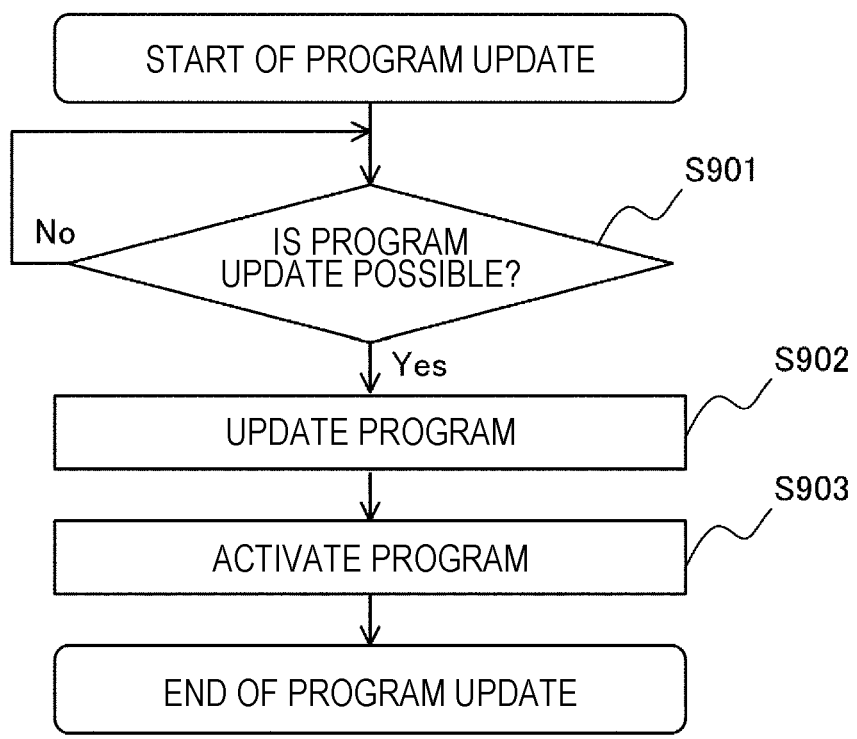
FIG. 8 is a flowchart showing a program updating process for updating a program functioning as a log collection unit, by the in-vehicle apparatus.

FIG. 8 is a flowchart showing a program updating process for updating a program functioning as a log collection unit, by the in-vehicle apparatus 30. An execution subject of each step described below is the program updating unit 153 of the in-vehicle apparatus 30. Upon receiving the update program from the server 10, the in-vehicle apparatus 30 executes the program updating process. Note that the update program has been transmitted from the server in step S706 of FIG. 6.

In step S901, it is determined whether or not it is a situation where program update is possible. The situation where the program update is possible means, for example, a situation where the vehicle mounted with the in-vehicle apparatus 30 is stopped. When it is determined that it is a situation where the update is possible, the process proceeds to step S902, whereas when it is determined that it is not a situation where the update is possible, the process remains at step S901.

In step S902, the program is updated with use of the update program. The update of the program may be a replacement of the entire program, may be a change of a part of the program, or maybe so-called patch application. In the following step S903, the program is activated and the log collection unit 151 is operated to start log collection. Then, the processing according to the flowchart of FIG. 8 is ended.

According to the above-described embodiment, the following working effects can be obtained.

(1) The in-vehicle apparatus 30 is connected to the server 10 via the network 20 and mounted on a vehicle, and the in-vehicle apparatus 30 includes: the log collection unit 151 configured to collect a log; the log storage unit 163 for accumulation of at least a part of the log; the log priority table storage unit 162 storing log priority information indicating a priority of a log to be accumulated in the log storage unit 163; the accumulation log determination unit (steps S605 to S607 in FIG. 5) configured to determine a log to be accumulated in the log storage unit 163 based on the log priority information; the communication unit 170 configured to transmit the log accumulated in the log storage unit 163 to the server 10; and the log priority table management unit 152 configured to update the log priority information stored in the log priority table storage unit 162 based on an update command from the server 10.

Since the in-vehicle apparatus 30 is configured in this way, it is possible to change the priority of the log based on a command from the server 10. Therefore, it is possible to collect appropriate logs in accordance with a situation of the in-vehicle apparatus. Further, it can be determined that attack is actually occurring by analysis of this log by the server 10.

(2) The in-vehicle apparatus 30 includes a log table storage unit 161 storing log information indicating contents of a log to be collected by the log collection unit 151, and the program updating unit 153 configured to update log information stored in the log table storage unit.

Therefore, when the server 10 detects a possibility of attack, it is possible to collect information that has not been collected in the past.

(3) The log collection unit 151 is a log acquisition program incorporating log information, and the program updating unit 153 updates the log information by rewriting the log acquisition program.

Therefore, since the log collection unit 151 does not need to externally read information indicating information to be collected as a log, a high speed operation is possible.

(4) The in-vehicle apparatus 30 includes the service control unit 154 configured to control a service provided to a passenger of a vehicle. The service control unit 154 stops the service based on a command from the server 10. Therefore, it is possible to stop the service affected by the attack based on the command from the server 10.

(5) The log priority information includes a condition regarding at least one of a valid time or a valid area. When at least one of a time or a position of the in-vehicle apparatus when the log has been collected matches a condition in the log priority information, the accumulation log determination unit (steps S605 to S607 in FIG. 5) regards the log priority information to be valid and determines the log to be accumulated in the log storage unit 163.

Therefore, the log collection unit 151 can determine the priority of the log in accordance with a state of the in-vehicle apparatus 30. This is valid in a case of determining whether or not a position of the in-vehicle apparatus 30 satisfies a condition stored in the area 205, or in a case where the log collection unit 151 refers to the log priority table before the record whose valid time has elapsed is deleted by the log priority table management unit 152.

(6) The log collection system 1 includes the in-vehicle apparatus 30 and the server 10 connected to the in-vehicle apparatus 30 via the network 20. The server 10 includes the log analysis unit 101 configured to analyze a log received from the in-vehicle apparatus 30 and detect a possibility of attack; and the log priority change instruction unit 103 configured to transmit an update command to the in-vehicle apparatus 30 to update the log priority information stored in the log priority table storage unit 162, when the log analysis unit 101 detects a possibility of attack.

Therefore, when the server 10 detects the possibility of attack from the log transmitted by the in-vehicle apparatus 30, the log collection system 1 can change the priority of the log to be accumulated in the in-vehicle apparatus 30.

(7) The in-vehicle apparatus 30 includes the log table storage unit 161 storing log information indicating contents of a log to be collected by the log collection unit 151. The server 10 includes the log change instruction unit 104 configured to update the log information stored in the log table storage unit 161.

Therefore, the server 10 can change the contents of the log to be collected by the in-vehicle apparatus 30. This can cause the in-vehicle apparatus 30 to collect detailed logs when the server 10 detects the possibility of attack.

(8) The log priority change instruction unit 103 outputs an update command to, in addition to the in-vehicle apparatus 30 that has transmitted the log in which the possibility of attack has been detected, another in-vehicle apparatus 30 that satisfies at least one of the conditions of having a same model as that of the in-vehicle apparatus, or being within a predetermined distance from a position where the log in which the possibility of attack has been detected is acquired.

Therefore, the server 10 can also collect a log to be used for determining occurrence of attack, from a plurality of other in-vehicle apparatuses 30 having a high possibility of being attacked. Since determination that attack has occurred based only on a log of a particular in-vehicle apparatus 30 is difficult or more likely to cause excessive detection, the server 10 can make comprehensive determination by using logs of a plurality of in-vehicle apparatuses 30.

(9) The in-vehicle apparatus 30 includes the service control unit 154 configured to control a service provided to a passenger of a vehicle. The server 10 includes the service instruction unit 105 configured to output a service stop command to the in-vehicle apparatus 30 when the log analysis unit 101 detects attack.

Therefore, the in-vehicle apparatus 30 can stop the service affected by the attack based on a command from the server 10.

(10) The log priority information includes a condition regarding at least one of a valid time or a valid area. The log priority change instruction unit 103 determines at least one of a valid time or a valid area in the updated log priority information, based on at least one of a time or a position at which the in-vehicle apparatus 30 has collected the log in which the possibility of attack is detected by the log analysis unit 101.

Therefore, the log collection system 1 can collect a temporary log based on at least one of the time or the position at which the log in which the possibility of attack has been detected is collected, and can determine that the attack is actually occurring.

The above-described embodiment may be modified as follows.

(Modification 1)

The server 10 may create a log priority table change request message for partially updating the log priority table. In this case, the log priority table change request message includes information indicating an existing record to be deleted and information indicating contents of a record to be added. According to this Modification 1, a data capacity of the log priority table change request message can be reduced.

(Modification 2)

The operator of the server 10 may obtain knowledge on a new attack technique, rewrite the log table and the log priority table such that a possibility of the attack can be detected, and use the log priority change instruction unit 103 or the log change instruction unit 104 to transmit the log table and the log priority table to the in-vehicle apparatus 30. According to this Modification 2, it is also possible to take care of an attack technique that has been found after shipment of the in-vehicle apparatus 30. However, only one of the log table or the log priority table may be rewritten.

(Modification 3)

The server 10 may transmit a program for executing a new service to the in-vehicle apparatus 30, and cause the in-vehicle apparatus 30 to execute the service. In that case, information on the service is added to the log table, the log priority table, and the temporary log table of the in-vehicle apparatus 30.

For example, in a case of adding a remote maintenance service of distributing, to the user from the server 10, a message introducing parts replacement timing and inspection based on the vehicle information such as a travel distance collected by the in-vehicle apparatus 30, the following problem is considered. That is, there is a risk that one other than the service provider who is managing the server 10 pretends to be the server 10 and transmits a message to the in-vehicle apparatus 30, to display advertisements or false information not desired by the user on the in-vehicle apparatus 30. Therefore, in adding this service, the log table is changed so as to collect a reception time of the message and a transmission source of the message. At this time, "Always" is inputted in the field of these condition types 204.

In addition, even in a case where features of the service provided in advance are expanded to require new collection of a log, this can be handled by similarly modifying the log table, the log priority table, and the temporary log table.

(Modification 4)

In the embodiment, the log analysis unit 101 analyzes the temporary log, and causes the in-vehicle apparatus 30 to stop the service upon detecting that the attack is actually occurring (FIG. 6, step S712). However, the in-vehicle apparatus 30 may be caused to stop the service when the log analysis unit 101 determines that there is a possibility of attack occurrence. According to this Modification 4, it is possible to further reduce the adverse effect on the service due to the attack.

(Modification 5)

In the embodiment, notification to the operator is made when attack occurrence is determined after the analysis of the temporary log, but this can be changed as follows. That is, the operator may also be notified when it is determined that there is a possibility of attack occurrence first, and the log priority table change request message may be transmitted after the operator checks the changed log table and the changed log priority table.

(Modification 6)

In the embodiment, analysis of a log is started when the log is collected from the in-vehicle apparatus 30, but the log may be analyzed in the following cases. For example, the log may be analyzed when a certain amount of time elapses, when a certain amount or more of logs are accumulated, when logs of a certain number or more of the in-vehicle apparatuses 30 are collected, or when an analysis start command from the operator is received with use of the input unit 130.

(Modification 7)

The in-vehicle apparatus 30 may preferentially determine whether or not to transmit the log when collecting the log. That is, in FIG. 5, the process may proceed to step S604 after execution of step S601, and the process may proceed to step S602 when negative determination is made in step S604. In this case, when negative determination is made in step S603, the process proceeds to step S605. According to this Modification 7, it is unnecessary to merge logs when communication with the server 10 is possible.

(Modification 8)

The log collection unit 151 of the in-vehicle apparatus 30 may externally read information indicating information to be collected as a log. That is, information indicating information to be collected as a log may not be hard-coded in the program. In this case, the log table storage unit 161 is stored in the memory 160, and the log collection unit 151 refers to the log table stored in the log table storage unit 161 and collects logs.

According to this Modification 8, it is possible to easily change the information collected as a log by the log collection unit 151.

(Modification 9)

The server 10 may include, in the log priority table change request message, information specifying a target for changing the log priority table, and transmit the log priority table change request message to other than the target for changing the log priority table. In this case, the in-vehicle apparatus 30 having received the log priority table change request message determines whether or not the in-vehicle apparatus 30 is the application target of the log priority table change request message.

According to this Modification 9, since it is possible to transmit the log priority table change request message without specifying the transmission target, it is easy to determine a transmission destination of the server 10.

(Modification 10)

In the embodiment, a plurality of in-vehicle apparatuses 30 are connected to the server 10, but only one in-vehicle apparatus 30 may be connected to the server 10.

(Modification 11)

In the embodiment, when the log priority table is updated (in a case where step S702: YES in FIG. 6), an update program for changing an operation of the log collection unit 151 of the in-vehicle apparatus 30 is created and transmitted (step S706 in FIG. 6). However, when all the log types described in the updated log priority table are collected in the existing log collection unit 151, creation and transmission of the update program may be omitted.

The above-described embodiment and modification may be individually combined.

While various embodiments and modifications have been described above, the present invention is not limited to these contents. Other aspects considered within the technical idea of the present invention are also included within the scope of the present invention.

The contents disclosed in the following priority basic application are incorporated herein by reference.

Japanese Patent Application No. 2016-164804 (filed on Aug. 25, 2016)

REFERENCE SIGNS LIST

1 log collection system
10 server
20 network
30 server
30 in-vehicle apparatus
101 log analysis unit
102 temporary log information creation unit
103 log priority change instruction unit
104 log change instruction unit
105 service instruction unit
110 service stop command unit
110 memory
111 collected log storage unit
112 log table collection storage unit
113 log priority table collection storage unit 114 temporary log table storage unit
120 server communication unit
151 log collection unit
152 log priority table management unit
153 program updating unit
154 service control unit
160 memory
161 log table storage unit
162 log priority table storage unit
163 log storage unit
164 in-vehicle apparatus information storage unit
165 update program storage unit
170 In-vehicle communication unit

The invention claimed is:

1. An in-vehicle apparatus connected to a server via a network and mounted on a vehicle, comprising: the in-vehicle apparatus including: a processor and a memory storing instructions that when executed configure the processor to:
collect a log of the in-vehicle apparatus at predetermined time intervals;
accumulate in a log storage at least a part of the log;
store in the log storage log priority information indicating a priority of the log to be accumulated in the log storage;
determine whether the collected log is to be accumulated or not to be accumulated in the log storage based on the log priority information;
transmit a log accumulated in the log storage to the server; and
update a log priority table with the log priority information, which is stored in the log storage and used for determining whether the collected log is to be accumulated or not to be accumulated in the log storage, based on an update command received from the server; and
the server including:
a server processor configured to analyze a log received from the in-vehicle apparatus at least by determining a difference between a received packet amount per time unit of the in-vehicle apparatus present at a particular location with a received packet amount in another location and comparing the difference to a threshold value;
detect a possibility of attack on the in-vehicle apparatus, at least in response to the comparison exceeding the threshold value; and
transmit the update command to the in-vehicle apparatus to update the log priority information stored in the log priority information storage, when the possibility of attack is detected and initiate an emergency stop service request.

2. The in-vehicle apparatus connected to the server via the network according to claim 1, further comprising: a log information storage storing log information indicating a content of the log to be collected; and the processor being further configured to update the log information stored in the log information storage.

3. The in-vehicle apparatus connected to a server via a network according to claim 2, wherein the processor is further configured to execute a log acquisition program incorporating the log information, and update the log information by rewriting the log acquisition program.

4. The in-vehicle apparatus connected to the server via the network according to claim 1, further comprising: the processor being further configured to control a service to be provided to a passenger of the vehicle, wherein the service is stopped based on an instruction from the server.

5. The in-vehicle apparatus connected to the server via the network according to claim 1, wherein the log priority information includes a condition regarding at least one of a valid time or a valid area, and the processor is further configured to regard the log priority information to be valid and determine a log to be accumulated in the log storage when at least one of a time or a position of the in-vehicle apparatus matches the condition in the log priority information when the log has been collected.

6. A log collection system comprising the in-vehicle apparatus connected to the server via the network according to claim 1, wherein the in-vehicle apparatus further comprises a log information storage storing log information indicating a content of the log to be collected, and wherein the server processor is further configured to update the log information stored in the log information storage.

7. A log collection system comprising the in-vehicle apparatus connected to the server via the network according to claim 1, wherein the server processor is further configured to output the update command to, in addition to the in-vehicle apparatus that has transmitted a log in which a possibility of attack has been detected, another in-vehicle apparatus that satisfies at least one of conditions of having a same model as that of the in-vehicle apparatus, or being within a predetermined distance from a position where a log in which a possibility of attack has been detected is acquired.

8. A log collection system comprising the in-vehicle apparatus connected to the server via the network according to claim 1, wherein the processor is further configured to control a service to be provided to a passenger of the vehicle; and the server processor is further configured to output a stop command of the service to the in-vehicle apparatus when the attack is detected.

9. A log collection system comprising the in-vehicle apparatus connected to the server via the network according to claim 1, wherein the log priority information includes a condition regarding at least one of a valid time or a valid area; and the server processor is further configured to determine at least one of the valid time or the valid area in the updated log priority information based on at least one of a time or a position where the in-vehicle apparatus has collected a log in which a possibility of the attack is detected.

* * * * *